United States Patent
Shepshelovich et al.

(10) Patent No.: US 8,109,473 B2
(45) Date of Patent: *Feb. 7, 2012

(54) SLOTTED HIGH LIFT AEROFOILS

(75) Inventors: Michael Shepshelovich, Ganey Tikva (IL); Alex Nagel, Petach Tikva (IL)

(73) Assignee: Israel Aerospace Industries Ltd., Lod (IL)

( * ) Notice: Subject to any disclaimer, the term of this patent is extended or adjusted under 35 U.S.C. 154(b) by 1216 days.

This patent is subject to a terminal disclaimer.

(21) Appl. No.: 11/802,964

(22) Filed: May 29, 2007

(65) Prior Publication Data

US 2007/0278354 A1    Dec. 6, 2007

Related U.S. Application Data

(60) Provisional application No. 60/808,957, filed on May 30, 2006.

(51) Int. Cl.
B64C 3/50    (2006.01)

(52) U.S. Cl. .......................... 244/215; 244/212; 244/216

(58) Field of Classification Search ................ 244/35 R, 244/198, 201, 204, 213, 215, 216, 217, 218, 244/219, 45 R See application file for complete search history.

(56) References Cited

U.S. PATENT DOCUMENTS

| | | | |
|---|---|---|---|
| 2004/0195464 A1* | 10/2004 | Vassberg et al. | 244/216 |
| 2007/0278353 A1 | 12/2007 | Shepshelovich et al. | |

OTHER PUBLICATIONS

Drela, M. "Newton Solution of Coupled Viscous/Inviscid Multielement Airfoil Flows", *AIAA* 90-1470, AIAA Fluid Dynamics, Plasmodynamics and Laser Conference Seattle, WA, (Jun. 1990).

Drela, M. "A User's Guide to MSES 2.6", *MIT Computational Aerospace Sciences Laboratory*, (May 1994).

Drela, M. "Elements of Airfoil Design Methodology", *Applied Computational Aerodynamics, Progress in Astronautics and Aeronautics*, Vo. 125, (1990).

Liebeck, R. H. "Subsonic Airfoil Design", *Applied Computational Aerodynamics, Progress in Astronautics and Aeronautics*, vol. 125, (1990).

Steinbuch, M., et al., "Development of UAV Wings-Subsonic Designs", *41st Aerospace Sciences Meeting & Exhibit*, Reno, NV, (Jan. 6-9, 2003).

Steinbuch, M., et al., "Development of High Altitude Long Endurance Airfoils", *42nd Aerospace Sciences Meeting and Exhibit*, Reno, NV, (Jan. 5-8, 2004).

Shepshelovich, M., "Aerodynamic Concept of IAI Long Endurance UAV", *44th Israel Annual Conference on Aerospace Sciences*, (Feb. 25-26, 2004).

Steinbuch, M., et al., "Development of UAV Wings Transonic Designs", *43rd Aerospace Sciences Meeting & Exhibit*, Reno, NV, (Jan. 10-13, 2005).

Steinbuch, M., et al., "The Concept of Hybrid Transonic-Subsonic Wings", *45th Israel Annual Conference on Aerospace Science*, (Feb. 23-24, 2005).

Shepshelovich, M., "UAV Wing Design—a New Challenge", *International Seminar-AERO INDIA*, (Feb. 7-9, 2005).

(Continued)

*Primary Examiner* — Joshua Michener

(74) *Attorney, Agent, or Firm* — The Nath Law Group; Susanne M. Hopkins; William L. Klima

(57) ABSTRACT

A slotted aerofoil configuration is provided in which the leading element thereof is contoured to provide mild stall characteristics. A wing based partially or fully on such an aerofoil, an air vehicle including such wings, and a method for designing an aerofoil are also disclosed.

49 Claims, 11 Drawing Sheets

OTHER PUBLICATIONS

Koss, D., et al., "Design and Experimental Evaluation of a Two-Element, High Lift/Low Drag, Long Endurance Airfoil", *35th Israel Conference on Aerospace Sciences*, (Feb. 15-16, 1995).

Koss, D., et al., "Development of Two-Element NLF Airfoils for Long Endurance Flight", *35th Aerospace Sciences Meeting & Exhibit*, (Jan. 6-10, 1997).

Nagel, A., et al., "Development of High-Lift, Mild Stall Airfoils", *43rd Israel Annual Conference on Aerospace Sciences*, (Feb. 19-20, 2003).

Koss, D., et al., "Design and Experimental Evaluation of High-Lift, Mild Stall Airfoil", *12th AIAA Aerodynamics Conference*, (Jun. 1994).

Nagel, A., et al., "Wing Concepts for Tactical UAV", *45th Israel Annual Conference on Aerospace Sciences*, (Feb. 23-24, 2005).

Hicks, R. M., et al., "Effects of Upper Surface Modification on the Aerodynamic Characteristics of the NACA $63^2$-215 Airfoil Section", *NASA Technical Memorandum 78503*, (1979).

McGhee, R. J., et al., "Wind-Tunnel Results for a Modified 17-Percent-Thick Low-Speed Airfoil Section", *NASA Technical Paper 1919*, (1981).

Marcus, B., et al., "Aerodynamics of Contaminated UAV Wings", *45th Israel Annual Conference on Aerospace Sciences*, (Feb. 23-24, 2005).

Nagel, A., et al., "The Concept of High-Lift, Mild Stall Wing", *24th International Congress of The Aeronautical Sciences*, (Aug. 29-Sep. 3, 2004).

Nagel, A., et al., "Development of Two-element, Mild-Stall UAV Wings", presented at the *47th Israel Annual Conference on Aerospace Sciences*, (Feb. 21, 2007).

Nagel et al. "Development of High-Lift UAV Wings", American Institute of Aeronautics and Astronautics, Jun. 2006.

Shepshelovich "The Progress in Development of UAV Wings", International Conference—ICAUV-2009, Bangalore, India.

* cited by examiner

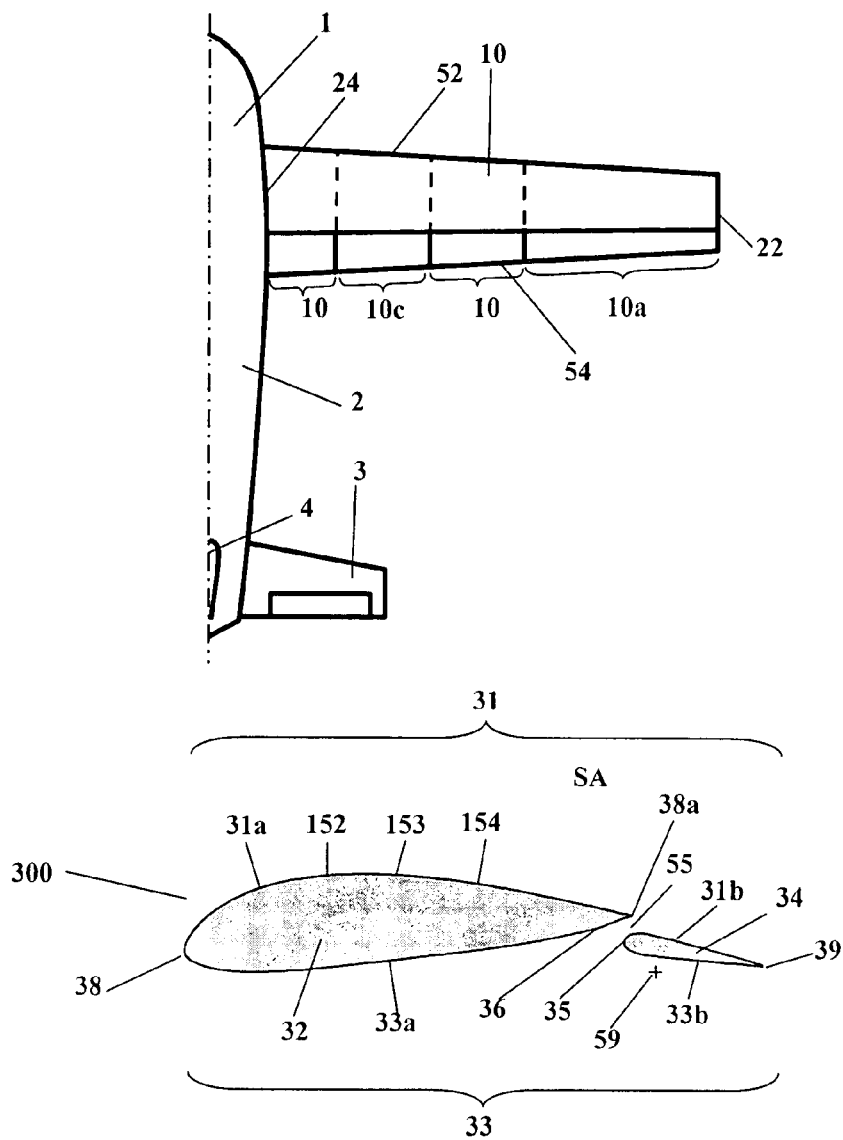
FIG. 2
FIG. 3
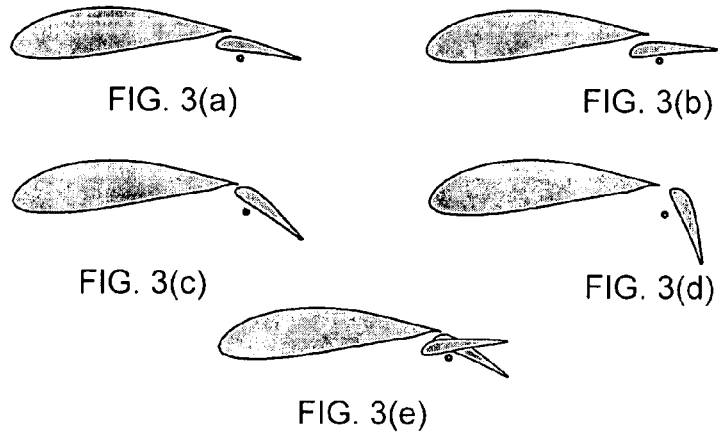
FIG. 3(a)
FIG. 3(b)
FIG. 3(c)
FIG. 3(d)
FIG. 3(e)

○ -formation of separated rflow on MS-ramp

○ -development of separation region on MS-ramp

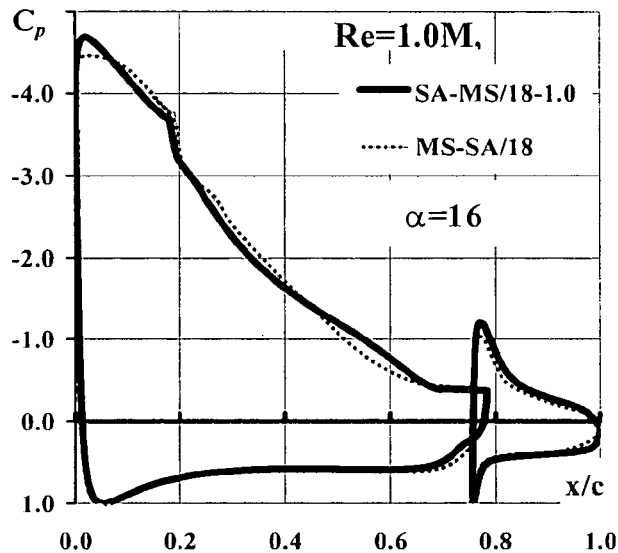
FIG. 5(b)
High lift, mild stall SA-MS airfoil
airfoil SA/MS 18/1.0
conventional two-element airfoil
airfoil MS/SA
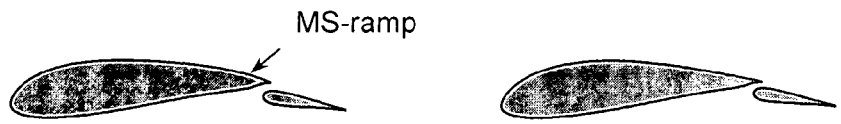
FIG. 6(a)                                    FIG. 6(c)
Main body / upper surface – distribution of local radius
FIG. 6(b)                                    FIG. 6(d)

SLOTTED HIGH LIFT AEROFOILS

This application claims the benefit of prior U.S. provisional patent application No. 60/808,957 filed date May 30, 2006, the contents of which are hereby incorporated by reference in their entirety.

FIELD OF THE INVENTION

This invention relates to aerofoil and wing configurations for aircraft, in particular to high-lift aerofoils and wings therefor.

BACKGROUND OF THE INVENTION

In many types of aircraft, particularly fixed wing aircraft, it is standard practice to avoid flying, under aerodynamically generated lift, at velocities close to stall airspeeds. This practice is even more strictly adhered to in the case for unmanned air vehicles (UAV), and improves safety and minimizes risk of loss or damage to the air vehicles, which can occur when losing aerodynamic control thereof.

However, this practice also results in a restriction in the operation of the air vehicle, particularly UAV's, to above a specified airspeed (which includes a speed safety margin imposed on stall airspeed), reducing operation in an otherwise allowable part of the flight envelope. The limitation is especially relevant for the flight and take-off/landing phases of small and medium size UAV flying at reduced airspeeds in windy air, and is also applicable to other aircraft. For such cases, reducing the specified airspeed (which may be accompanied by an increased angle of attack to maximize lift) eventually leads to stall of the wings and loss of aileron's aerodynamically generated controlling forces, and may produce uncontrollable dynamic response of the aircraft, leading to the development of spin modes that are difficult to recover from, particularly in the case of unmanned air vehicles. In particular, there is often a fast variation in aerodynamic characteristics of the aircraft at stall and post-stall angles of attack that are highly unstable/unreliable and are difficult to predict, and which render the aircraft (specially UAV's) difficult to control in flight. The actual speed safety margin (to avoid the stall flight regime) imposed on aircraft operation is often dependent on the stall pattern of the wing and may vary, depending on the specific case and required flight conditions, and the standard speed safety margin adopted for UAV operations is: $V_{flight} \geq 1.2 V_{stall}$.

Stall characteristics for subsonic-type wings or aerofoils (synonymously referred to also as airfoils) may be classified as follows:

Abrupt stall is characterized by the fast drop of the lift at stall angle of attack, typically resulting in an approximate 20-50% loss of lift coefficient within about 1° to about 3° after the stall angle of attack, depending on the level of maximum lift (e.g., moderate or high lift wings). This type of stall is associated with flow separation at the leading edge of the wing (leading edge stall), or, with very fast progress of trailing edge separation Moderate stall is characterized by the gradual development of trailing edge separation at the stall of the wing and moderate loss of the lift at post-stall angles of attack, typically resulting in a rate of loss of lift coefficient at post-stall angles of attack that is approximately close to the rate or slope of lift coefficient gain prior to the stall angle of attack, but of opposite slope thereto. This type of stall is associated with moderate progress of trailing edge separation at post-stall angles of attack.

Mild stall is characterized by almost constant level of the lift at post-stall domain and is associated with slowly creeping trailing edge separation that moderates the rate of lift losses at high angles of attack, typically resulting in an approximately constant lift coefficient (within between about 5% and about 10% of the maximum lift coefficient for at least about 5° after the stall angle of attack).

The stall angle of attack may be defined as the angle of attack at which maximum lift coefficient (or up to about 99% of maximum lift coefficient) is first realized. The stalling speed is dependent on the weight (W) of the air vehicle, maximum lift coefficient ($C_{l\ max}$), wing area ($S_w$), and air density ($\rho$), and is generally defined as $$V_{stall} = (2W/(\rho^* C_{l\ max} {}^* S_w))^{0.5}$$

Stall characteristics also tend to deteriorate as maximum lift is increased, resulting in more difficulties when attempting to comply with considerations of flight safety and to avoid unfavorable stall patterns. This is especially relevant for high-lift, long endurance wings of some UAV, such as for example the HERON high-lift long endurance UAV, manufactured by IAI, Israel. In the HERON, optimum endurance performance is via high loitering lift coefficients, which requires high maximum lift.

FIGS. 1(a) and 1(b) illustrates some variations of aircraft endurance factor ($C_L^{1.5}/C_D$) for the different levels of configuration parasite drag, and marks a general region therein generally relevant for UAV with high and moderate aspect ratio wings. For some cases of interest (for example, where there is increased parasitic drag due to external installations, protruding payloads, engine-airframe integration, installation of cooling systems, etc.), there is a clear advantage of high-lift, loitering flight. However, with the need to impose a speed safety margin on the minimum loiter velocity $V_{loiter} = 1.2 V_{stall}$, the full potential for increased lift that may be generated when flying at lower velocities may not be achieved for such vehicles, particularly UAV's.

Advanced aerofoil design concepts and available CFD tools facilitate development of wings for many new aerodynamic configurations. This is especially relevant for unmanned air vehicles, where variety of mission requirements, multi-point design specifications and imposed non-aerodynamic constraints often render existing aerofoils impractical for project evaluation/development work, and the design of new customized wings is typically a development choice. The cases of small and medium size UAV (the class of Tactical UAV, having a weight of between about 50 kg and about 500 kg) may be of particular interest for development of high-lift UAV wings because of the encountered range of relatively low Reynolds numbers. For unswept wings of conventional wing-body-tail configurations, the typical chord Reynolds numbers close to stall airspeeds are around Re=0.3-1.0*10^6. This is above the Reynolds numbers of Mini UAV wings, with their characteristics strongly dominated by viscous flow effects, but still belonging to domain of low Reynolds numbers aerodynamics.

Aerofoil configurations with enhanced lift-carrying capabilities can be attractive for development of UAV wings because of their potential to provide an answer to many desirable UAV characteristics, and the concept of high-lift, loitering flight has been adopted for the development of subsonic and transonic long endurance UAV (Refs. 5, 6, 7, 10). This approach is especially relevant for design of configurations with high aspect ratio wings and increased level of parasitic drag, in which optimum endurance performance of UAV may be realized at high loitering lift coefficients, leading to very demanding requirements for maximum lift. Schematic illustration of the concept is presented in FIGS. 1(a) and 1(b), using simplified parabolic approximation of aircraft drag polars, and it may be appreciated that for low level of parasite drag (the case of sailplanes), moderate values of loitering lift coefficients ($C_{L\,loiter}$~0.8-1.0) and maximum lift ($C_{L\,max}$~1.3-1.5) are sufficient for realization of the best endurance performance. Conversely, for increased values of aircraft parasite drag, the region of optimum endurance performance tends to deviate to domain of high loitering lift coefficients. Two-element aerofoils (referred to herein as "SA aerofoils"), with high maximum lift, were used in the development of the HERON, a long endurance UAV produced by IAI, Israel, and demonstrated in flight its enhanced loitering performance (Refs. 11, 12). Other high-lift, two-element aerofoils for mission-adaptive wing sections have been adopted at IAI as a main design concept for aerodynamic development of long endurance UAV (Refs. 5, 7, 10), and these aerofoils have a built-in option of take-off/landing flaps, ailerons, airbrake and decambering at maximum speed flight—for example, a two-element, slotted aerofoil (denoted SA-19), was developed in mid 90's for the experimental IAI Firebird UAV.

SA-aerofoils are designed straightforward for deployed flap position and for high loitering lift coefficient. They rely on rotation of the second element around external hinge point for adjustment of aerofoil performance to different flight regimes. Furthermore, SA-aerofoils of the prior art are inherently high lift wing sections that rely on positive deflections of the second element for a further enhancement of maximum lift, which comes with a certain degradation of stall pattern that is typical for the wing sections employing high-lift devices, so that standard speed safety margin $V_{flight} \geq 1.2 V_{stall}$ is usually applied to operation of such wing sections.

For the development of small and medium size UAV with moderate aspect ratio wings, high-lift, loitering flight retains its attraction as a design concept because of a further increase of parasitic drag which may be attributed to protruding payloads, drag-consuming installations, power plant/airframe integration, engine cooling, etc.

SUMMARY OF THE INVENTION

The term "suction peak" refers herein to relatively fast flow acceleration at the leading edge of the aerofoil, producing a spiky pressure distribution.

The term "blunt leading edge" refers herein to increased thickness and increased local radius of the forward portion of the aerofoil that prevents formation of suction peak at high angles of attack and produces a rounded pressure distribution at the leading edge of the aerofoil.

Herein, the term "mild-stall aerofoils" (MS-aerofoils) refers to a class of single-element wing sections aerofoils characterized by the lift curve having a plateau range of lift coefficients at post-stall angles of attack followed by gradual decline of the lift at high post-stall angles of attack (Refs. 13-18). The plateau range and the gradual decline correspond to a gradually developing trailing edge separation of the flow, until total separation of the aerofoil is achieved. Accordingly, it is often possible to more or less maintain the lift generated by the wing at the level of maximum lift, or within about 10% for example, for a relatively wide range of post-stall angles of attack, typically at least about 5°, 7° or 8° or greater than 8°.

Without being subject to theory, the mechanism of mild stall of high-lift aerofoils may be explained by the combination of continuous lift build-up at the forward portion of MS-aerofoils and slowly creeping trailing edge separation. The blunt or rounded leading edge of MS-aerofoils helps to produce rounded pressure distributions at the forward portion of the wing section, preventing formation of sharp suction peak at stall and post-stall angles of attack. This supports the gradual development of trailing edge separation that is initiated prior to the stall angle of attack and is controlled by the shape of aft camber.

Herein, the term "High-Lift Mild-Stall aerofoils" (HL-MS aerofoils) refers to a special class of mild stall aerofoils that, for any Reynolds number in the range of between about $0.3 \cdot 10^6$ to about $2 \cdot 10^6$, provide maximum lift $C_{l\,max}$ above the $C_{l\,max}$ for the same Reynolds number according to a minimum boundary line as defined by a linear variation between points of $C_{l\,max}$=1.6 at Re=$0.3 \cdot 10^6$ and $C_{l\,max}$=1.95 at Re=$2.0 \cdot 10^6$. This variation serves to differentiate HL-MS aerofoils (providing high lift) from conventional mild stall aerofoils (MS-aerofoils) with moderate maximum lift, wherein conventional mild stall aerofoils, such as for example NACA4415 and its derivatives, achieve maximum lift coefficient below this minimum boundary.

Herein, the term "Slotted Aerofoil" (SA-aerofoils)—refers to two-element aerofoils composed of a first element—the main aerofoil body, and a second element (for example in the form of a flap or aileron) segment. The second element of SA-aerofoils is separated from the main body by a slot which is substantially open for the airflow at any deflection of the flap. The separation between the first and second elements may be permanent, or alternatively the aerofoil may be configured with a second element that is reversibly deployable to a position defining the slot. A feature of this structure is that it facilitates actuation of the second element through positive or negative deflection angles. Another feature of this structure is that a box-like relatively rigid construction may be achieved. With the second aerofoil element optionally coupled to actuators, the SA-aerofoils can provide features of adjustable geometry and have built-in options for operating as take-off/landing flaps, ailerons, airbrakes and for providing decambering at maximum speed flight. SA-aerofoils can include mission-adaptive, two-element, high-lift arrangements, and are inherently high-lift aerofoils that are particularly suitable for development of long endurance UAV and other aircraft, loitering at high lift coefficients. Such basic SA-aerofoils may be designed for cruising/loitering flight at high lift coefficients, and optionally relies on a second element rotation around external hinge point for adjustment of the aerofoil to different flight regimes.

The present invention provides a high lift, two-element, mild stall wing based on corresponding high lift, two-element, mild stall aerofoils. This per se novel concept introduces an aerodynamic feature referred go herein as a mild stall ramp, or MS-ramp, at the aft portion of the main body of the aerofoil, on the suction surface thereof, while retaining the bluntness of the leading edge of the aerofoil. Gradual development of separated flow on the MS-ramp, combined with continuous lift build-up at the forward portion of the aerofoil produces mild stall characteristics at the extended range of post-stall angles of attack, and combines features of adaptive geometry with stall/post-stall flight capabilities at the level of maximum lift that is inherent to two-element aerofoils.

The present invention relates to a slotted aerofoil configuration comprising a leading element, a trailing element and a slot therebetween, wherein said leading element is contoured to provide mild stall characteristics. The leading element may include a leading edge of the aerofoil, and said trailing element may include a trailing edge of the aerofoil, wherein said leading element comprises a downstream suction surface portion comprising a local curvature that does not substantially decrease along a direction towards said slot. In some embodiments, the said curvature substantially increases along said portion along said towards said slot. In some embodiments, the said portion comprises one of at least about 10%, at least about 20%, at least about 30%, at least about 40%, or at least about 50% of a local chord of said leading element, terminating at a trailing portion of said leading element.

In some embodiments, the said trailing element may be pivotably movable with respect to said leading element via a hinge point. Optionally, the hinge point may be outwardly displaced with respect to an outer contour of said trailing element. Further optionally, a suitable actuation mechanism may be provided for deflecting said trailing element in a positive or negative direction with respect to the leading element. Further optionally, the said trailing element may be adapted for operating as one or more of: flaps; ailerons; airbrake; and for providing decambering at maximum speed flight. In some embodiments, the slot comprises a width dimension at least 2% of the aerofoil chord.

In some embodiments, the aerofoil maintains a stall plateau for an angle of attack range of at least 5 degrees where the coefficient lift associated with said aerofoil is within up to about 5% of a maximum coefficient lift associated with said aerofoil.

In some embodiments, the aerofoil is configured for generating a pressure coefficient distribution obtained on the suction surface of the primary element comprising an inflexion point, associated with said suction surface portion.

The present invention also relates to a wing for an aircraft, comprising at least a first wing portion comprising a mild stall slotted aerofoil configuration (SA-MS) according to aspects of the invention. The aerofoil may comprisr a leading element including a leading edge of the aerofoil, and a trailing element including a trailing edge of the aerofoil, and a slot between said leading element and said trailing element, wherein said leading element comprises a downstream suction surface portion comprising a local curvature that does not substantially decrease along a direction towards said slot. In some embodiments, the curvature substantially increases along said portion along said towards said slot. In some embodiments, the portion comprises one of at least about 10%, at least about 20%, at least about 30%, at least about 40%, or at least about 50% of a local chord of said leading element, terminating at a trailing portion of said leading element. In some embodiments, the trailing element for at least a portion of the wing is pivotably movable with respect to said leading element via a hinge point. Optionally, the hinge point is outwardly displaced with respect to an outer contour of said trailing element. Further optionally, a suitable actuation mechanism may be provided for deflecting said trailing element in a positive or negative direction with respect to the leading element. Further optionally, the trailing element may be adapted for operating as one or more of: flaps; ailerons; airbrake; and for providing decambering at maximum speed flight. Further optionally, the slot may comprise a width dimension at least 2% of the aerofoil chord. In some embodiments, for at least part of the wing, the aerofoil maintains a stall plateau for an angle of attack range of at least 5 degrees where the coefficient lift associated with said aerofoil is within up to about 5% of a maximum coefficient lift associated with said aerofoil. In some embodiments, for at least part of the wing, the aerofoil is configured for generating a pressure coefficient distribution obtained on the suction surface of the primary element comprising an inflexion point, associated with said suction surface portion.

In some embodiments, the said first wing portion extends along substantially the full span of the wing.

In some embodiments, the wing further comprises a second wing portion based on a slotted aerofoil configuration comprising a leading element including a leading edge of the aerofoil, and a trailing element including a trailing edge of the aerofoil, and a slot between said leading element and said trailing element, wherein said leading element comprises a downstream suction surface portion comprising a local curvature that substantially decreases along a direction towards said slot. Optionally, the second wing portion is an outboard portion with respect to said first wing portion.

In some embodiments, the wing further comprises a second wing portion configured for providing mild stall characteristics. Optionally, the second wing portion may be configured for providing high-lift mild stall characteristics at least at Reynolds numbers in the range between about $0.2*10^6$ and about $2.0*10^6$. Optionally, the second wing portion may be based on high-lift, mild-stall aerofoils (HL-MS aerofoils), each said HL-MS aerofoil having a maximum lift coefficient $(C_{l\,max})$ at a Reynolds number (R) between about $0.3*10^6$ and about $2.0*10^6$ that is substantially not less than a minimum value for the maximum lift coefficient $((C_{l\,max})_{min})$ at said Reynolds number R according to the relationship:

$$(C_{l\,max})_{min}=(0.35/(1.7*10^6))*R+1.6$$

Optionally, the second wing portion is an inboard portion or alternatively an outboard portion with respect to said first wing portion.

Alternatively, the second wing portion may be configured for providing mild stall characteristics at least at Reynolds numbers in the range between about $0.2*10^6$ and about $2.0*10^6$. Optionally, the second wing portion may comprise mild-stall aerofoils (MS aerofoils), each said MS aerofoil having a maximum lift coefficient $(C_{l\,max})$ at a Reynolds number (R) between about $0.3*10^6$ and about $2.0*10^6$ that is substantially less than a minimum value for the maximum lift coefficient $((C_{l\,max})_{min})$ at said Reynolds number R according to the relationship:

$$(C_{l\,max})_{min}=(0.35/(1.7*10^6))*R+1.6$$

Optionally, the second wing portion is an inboard portion or alternatively an outboard portion with respect to said first wing portion.

The present invention also relates to an air vehicle comprising wings according to other aspects of the present invention. Said wings may be the main lift-producing wings of said air vehicle. Optionally, the air vehicle may be an Unmanned Air Vehicle (UAV). Further optionally, the UAV may be adapted for long range endurance and loitering.

The present invention also relates to a method for designing an aircraft wing aerofoil, comprising:

(a) designing the aerofoil as a two element aerofoil, comprising a leading element and a trailing element, and a slot therebetween, (b) contouring a downstream portion of a suction surface of said leading element such as to provide mild stall characteristics;

Step (b) may include contouring a downstream portion of a suction surface of said leading element such that a local curvature of said portion does not substantially decrease along a direction towards said slot.

In some embodiments, the said portion comprises a curvature that substantially increases along said aft portion thereof towards said slot.

Features of particular embodiments of the invention may include at least one of the following:

High-lift capabilities at reduced Reynolds numbers of stalling speeds.

Flight safety at airspeeds close to stall and capability to fly and recover UAV from domain of post-stall angles of attack.

Capability to control air vehicle at stall/post-stall angles of attack in all stability planes.

Elimination of speed safety margin and extension of usable range of the lift substantially up to the maximum lift.

Improved endurance performance of configurations with moderate aspect ratio wings and increased level of parasite drag.

Improved take-off and landing performance, including capabilities to increase the glide angles at approach to landing and to perform the landing at stall/post-stall angles of attack.

Improved maneuverability and enhanced maximum turn performance.

Increased thickness ratio of wing sections for efficient structure and sufficient volume for wing internal fuel.

Furthermore, at least one of the following features of embodiments of SA-MS aerofoils may be considered attractive for development of tactical UAV wings:

SA-MS wings according to aspects of the invention substantially retain the features of slotted SA wing. However, for SA-MS wings, this may be achieved at the level of maximum lift that is comparable to high-lift, two-element aerofoils. The level of maximum lift of SA-MS wing may be controlled by flap setting, supported by adequate design of MS-ramp.

SA-MS wings according to aspects of the invention provide mild stall and thus usable lift substantially up to or very close to the maximum lift ($C_l$) level, and moreover substantially retain the features of adaptive geometry, providing a built-in option of flaps, ailerons, airbrakes and decambering at maximum speed flight. This feature of mission-adaptive wing, together with increased maximum lift, differentiate the concept of SA-MS wing from convention slotted wings and may be attractive for development of Tactical UAV wings.

Adjustment of SA-MS wings to the positive flap settings will require a further increase of the bluntness of forward portion of the aerofoil. This may be beneficial for reduced sensitivity to ice accretion, and SA-MS aerofoils may be better suited for the development of wing sections with all weather flight capabilities.

Elimination of speed safety margin is possible, post-stall flight capabilities and "passive self-recovery in pitch plane" may be provided in some embodiments. In other words, the increased moment arm due to upstream migration of the center of lift when flow separation occurs, coupled with possibly increased lift at the tail, can provide a restoring moment to the air vehicle in the pitch plane, thereby tending to reduce the angle of attack in a passive manner.

The present invention also relates to an air vehicle comprising wings according to the invention. The wings may be the main lift-producing wings of said air vehicle and/or the tailplane, canards or any other lift producing or control surface of the air vehicle. For example, the air vehicle may be an Unmanned Air Vehicle (UAV), in particular adapted for long range endurance and loitering. The air vehicle may be configured for operating at velocities at and beyond the stall velocity thereof, i.e., at post-stall angles of attack.

According to aspects of the invention, high lift wings are provided for aircraft, in particular fixed wing aircraft. For the purpose of example, such aircraft is described herein as a fixed-wing aircraft, of the regular subsonic/transonic configuration, having a fuselage section, main wings, tailplane, vertical stabilizer, and a propulsion system. However, the present invention is applicable to other types of aircraft, for example: gliders; subsonic/transonic aircraft having canards rather than a tailplane; general aviation aircraft, cruise missiles and other airborne ordinance, and so on. Furthermore, while the present invention finds particular application in UAV aircraft, the invention may also be applied to manned aircraft, mutatis mutandis, in particular to general aviation, sailplanes, subsonic transport, naval aviation, and so on.

BRIEF DESCRIPTION OF THE DRAWINGS

In order to understand the invention and to see how it may be carried out in practice, a number of embodiments will now be described, by way of non-limiting example only, with reference to the accompanying drawings, in which:

FIG. 2 schematically illustrates an aircraft comprising a wing according to a first embodiment of the present invention.

FIG. 3 illustrates a mission-adaptive, adjustable geometry, two-element aerofoil according to an embodiment of the invention; one particular form of this embodiment is illustrated in FIGS. 3(a) to 3(e) in various modes of operation: FIG. 3(a)—cruise, loiter mode; FIG. 3(b)—decambering mode for high speed flight; FIG. 3(c)—landing flap mode; FIG. 3(d)—airbrake mode; FIG. 3(e)—aileron mode.

FIGS. 5(a) and 5(b) compare pressure distributions obtained for SA-MS/18-1.0 and MS-SA/18 aerofoils, at angle of attack $\alpha$ of 13 and 16 degrees, respectively.

FIGS. 6(a) and 6(b) illustrate the geometry of high lift mild stall SA-MS aerofoils according to one aspect of the invention, and FIGS. 6(c) and 6(d) illustrate the geometry of conventional two-element aerofoils.

Figure 1A:
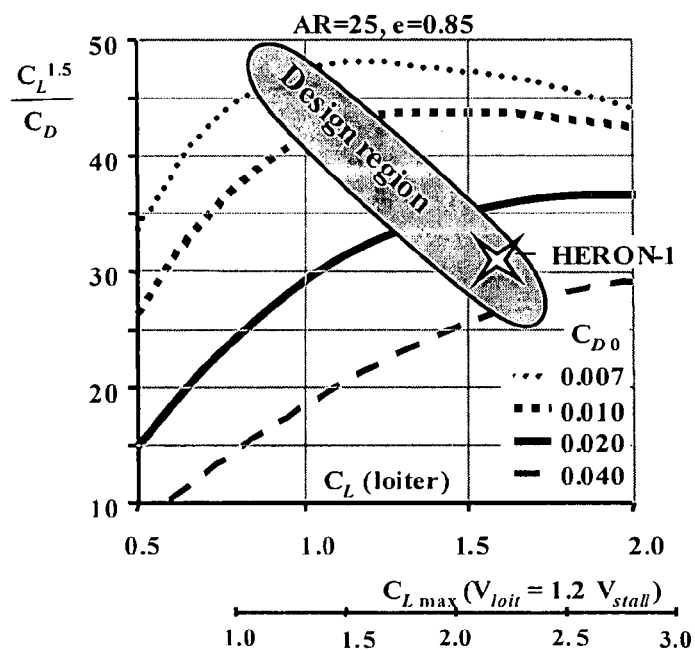
FIGS. 1(a) and 1(b) illustrates example design regions of long endurance UAV having high aspect ratio (AR=25) and moderate aspect ratio (AR=10).
Figure 1B:
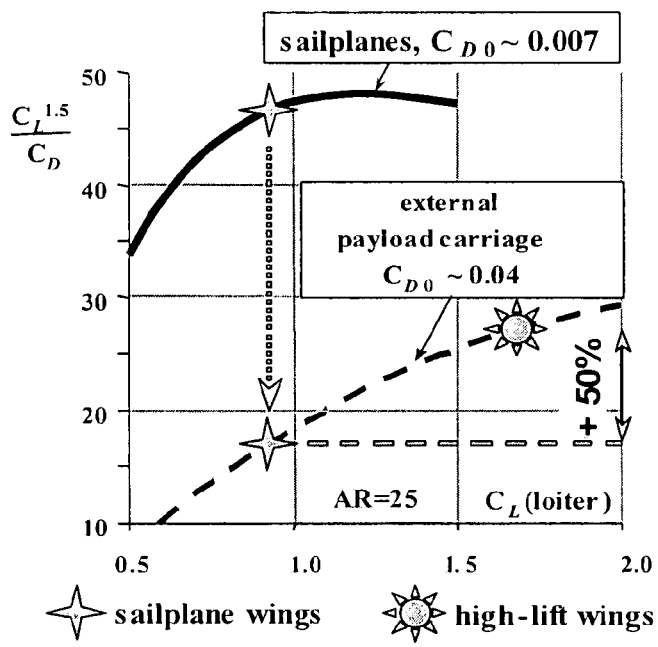

| NOMENCLATURE | |
|---|---|
| $C_L^{1.5}/C_D$ | aircraft endurance factor |
| $C_L$ | aircraft lift coefficient |
| $C_d$ | aerofoil drag coefficient |
| $C_l$ | aerofoil lift coefficient |
| $C_l$max | aerofoil maximum lift |
| $C_m$ | aerofoil pitching moment |
| $C_p$ | pressure coefficient |
| $C_{D0}$ | zero lift drag |
| e | spanload efficiency |
| Re | Reynolds number |
| t/c | thickness ratio |
| x/c | chord fraction |
| α | angle of attack |
| $\delta_{ail}$ | aileron deflection |
| $\delta_{flap}$ | flap deflection |
| AR | aspect ratio |
| CFD | computational fluid dynamics |
| IAI | Israel Aircraft Industries |
| NLF | natural laminar flow |
| MS | mild stall |
| SA | slotted aerofoil |
| UAV | unmanned air vehicle |
| W | weight |

DETAILED DESCRIPTION

According to a first embodiment of the invention, high lift wings are provided for aircraft, in particular fixed wing aircraft. For the purpose of example, and referring to FIG. 2, such an aircraft is described herein as a fixed-wing aircraft, generally designated with reference numeral 1, comprising a regular subsonic/transonic configuration, having a fuselage section 2, main wings 10 (only the starboard wing (also referred to herein as a "wing half") is illustrated in this figure), tailplane 3, vertical stabilizer 4, and a propulsion system (not shown). However, the present invention is also applicable, mutatis mutandis, to other types of aircraft, for example: gliders; subsonic/transonic aircraft having canards rather than a tailplane; general aviation aircraft, cruise missiles or other air delivered ordinance, and so on. Furthermore, while the present invention finds particular application in UAV aircraft, the invention may also be applied to manned aircraft, mutatis mutandis, in particular to general aviation, sailplanes, subsonic transport, naval aviation, guided or other weapons, and so on.

In the illustrated embodiment of FIG. 2, and by way of non-limiting example, the wing has a substantially trapezoidal plan shape, the leading edge 52 of the wing 10 being substantially rectilinear and having a substantially zero sweep angle, and the wing having a taper of between about 0.6 to about 1.0, between the root 24 and the tip 22. The trailing edge 54 of the wing 10 is also substantially rectilinear and comprises a substantially negative sweep angle. In other variations of this embodiment, the wing 10 may have a different plan form, for example: swept-back or swept forward, and/or with a different taper ratio (along the full wing, or different taper ratios for the inboard section and the outboard section), for example a zero taper ratio along the span of the wing 10; and/or having a different plan form, including curved leading edges and/or trailing edges such as an elliptical form, for example; and/or the inboard section and/or the outboard section may have a positive, negative or zero dihedral angle; and so on.

Referring also to FIG. 3, the wing 10 is based on a two-element mild stall slotted aerofoil (SA-MS aerofoil) 300, having a substantially static primary element 32 and an optionally pivotable secondary element 34. The primary element 32 comprises the leading edge 38 of the aerofoil, which coincides with the leading edge 52 of the wing 10, and major portions 31a, 33a, of the suction surface 31 and pressure surface 33 thereof, respectively, and a trailing portion 38a. The secondary element 34 comprises the trailing edge 39 of the aerofoil, which coincides with the trailing edge 54 of the wing 10, and minor portion 31b, 33b, of the suction surface 31 and pressure surface 33 thereof, respectively. A slot 55 separates the leading portion 35 of the secondary element 34 from the trailing portion 36 of the primary element 32. For example, the slot 55 may have a width at least 2% of the aerofoil chord in a non-deflected position of the flap element.

The precise form of the slot 55 generally depends on the particular mode of operation of the wing 10, as illustrated, for example, in FIGS. 3(a) to 3(e) which refer to cruise/loiter, maximum speed decambering, landing flap mode, airbrake mode and aileron configurations, respectively. Optionally, the hinge point 59 of the secondary element 34 is outwardly displaced with respect to the lower (pressure) surface of the secondary element 34. The airflow through slot 55 provides enhanced efficiency and linearity of the aerodynamic characteristics of the aerofoil as compared to a similar non-slotted aerofoil, though more abrupt stall characteristics. A suitable actuation mechanism (not shown) may be provided for actuating the secondary element 34 to adopt the range of deflection angles desired.

In variations of this embodiment, the secondary element 34 is spatially and/or rotationally fixed with respect to the primary element 32, and optionally, the secondary element 34 may comprise control surfaces such as ailerons, flaps and so on, that are pivotable with respect to the secondary element 34.

In one variation of this embodiment, the wing half 10 may optionally comprise a number of span-wise wing sections, for example serially adjoining sections 10a, 10b, 10c and 10d, between the tip 22 and root 24, in which for each wing section the secondary element 34 is configured to perform a particular function. For example, in outboard wing section 10a the secondary element 34 may be configured as an aileron, in wing section 10b the secondary element 34 may be configured as an air brake, in wing section 10c the secondary element 34 may be configured as a rigid non-movable element, and in inboard wing section 10d the secondary element 34 may be configured as a flap.

Optionally, each wing section may be configured as a modular unit, enabling different permutations of wing sections comprising ailerons, flaps, brakes, rigid sections etc to be assembled with relative ease, particularly when the aspect ratio is zero.

By way of non-limiting example, and referring to FIGS. 3(a) to 3(e), such an SA-MS aerofoil design may have any suitable thickness-to-chord ratio $(t/c)_{max}$, camber distribution and a thickness distribution. Optionally, the leading edge 38 of the SA-MS aerofoil may also be relatively blunt or rounded, having a low curvature leading edge radius, and aft portion of the aerofoil may also be cambered.

Figure 4A:
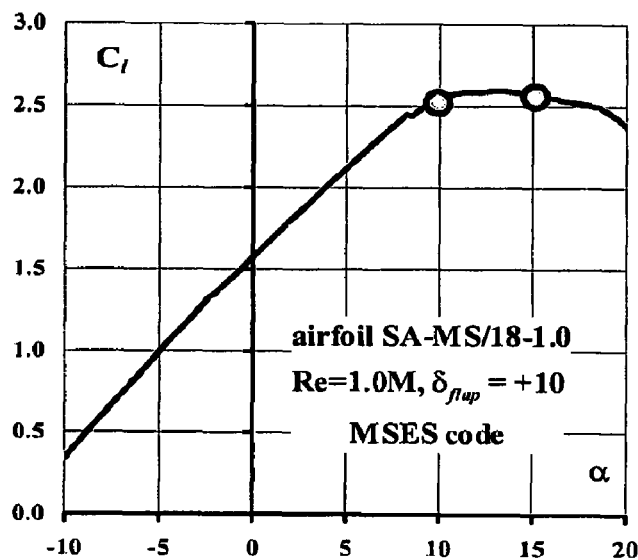
FIG. 4(a), 4(b) and 4(c) illustrate the development of the separation region on MS-ramp of SA-MS aerofoils.
Figure 4B:
Figure 4C:

The SA-MS aerofoil 300 further comprises a highly cambered aft portion of the main body or primary element 32 of the SL two-element aerofoil 300, this aft portion being referred to herein as a mild-stall ramp section, or MS-ramp 154. The profile of the MS ramp 154 is shaped for a particular design Reynolds number, such as to produce a slowly creeping trailing edge separation at post-stall angles of attack. Referring to FIGS. 4(a) to 4(c), the MS ramp 154 forms separated flow at stall angles of attack, for example at about 10 degrees. The separated region on the MS-ramp at post stall angles of attack, for example at 15 degrees, continues to grow slowly, but does not induce full separation over the primary element 32 of the two-element SA-MS aerofoil 300, and enables a relatively high level of lift to be maintained at the post-stall angles of attack. Controllable development of the separated region on the MS-ramp 154, together with rounded pressure distributions at the leading edge 38 (FIG. 5(a) and FIG. 5(b)), which may be obtained with a relatively blunt or rounded leading edge, having a low curvature leading edge radius, provides mild stall characteristics at the level of lift that is generally generated with high-lift, two-element aerofoils.

The upper suction surface 31 of the SA-MS aerofoil section, in particular the said MS ramp 154, includes portions of the downstream suction surface having a local curvature $(1/r_{local})$ that may increase, and/or that may remain substantially constant, i.e., where the local curvature does not substantially decrease, along the chord towards the trailing portion 38a of the main, leading element 32 of the two-element SA-MS aerofoil, beginning at an intermediate portion of the suction surface 31a thereof. The MS-ramp 154 is downstream of an upstream portion 152 of suction surface 31a, in which the local curvature is reducing along the chord length (see FIG. 6(a) and FIG. 6(b), for example). As is also evident from FIG. 6(b), the rate of change of curvature along the suction surface 31 from the leading edge 38 to trailing portion 38a may be positive in some variations of this embodiment, or zero in other variations of this embodiment. An SL aerofoil corresponding to aerofoil 300, but not including said MS ramp 154, is illustrated in FIG. 6(c) and FIG. 6(d).

Optionally, the point 153 on the suction surface 31a along the chord at which the curvature stops decreasing, i.e., the transition between portions 152 and 154, may be located at approximately at the point at which the laminar flow turns turbulent i.e., transition in laminar separation bubble. In any case, point 153 may be, by way of example, at about 30%, 40%, 45%, or 50%, or at any point between about 30% and about 50%, or greater than 50% of the local chord (i.e., the chord of the primary element 32). Further optionally, the local curvature may be constant or increasing up to about 80%, 90%, 95% or more of the local chord.

Aerodynamically, the aerofoil 300 maintains a stall plateau for angle of attack range of at least 5 degrees where the $C_l$ is within up to about 5% of maximum $C_l$.

Figure 5A:
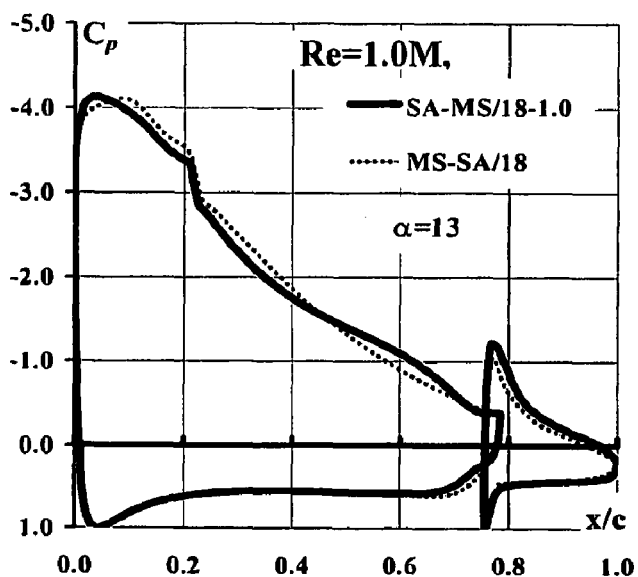

Furthermore, and referring to FIG. 5(a) and FIG. 5(b), for example, the pressure coefficient ($C_p$) distribution obtained with the MS ramp on the suction surface of the primary element 32 of the aerofoil 300 includes an inflexion point, 310a, 310b, respectively, which may be present from pre-stall angles of attack up to high post stall angles of attack. Without being subject to theory, the inventors believe that this inflexion point in the $C_p$ distribution results in a high adverse pressure gradient that effectively prevents or retards movement of the flow separation point of the suction surface airflow in an upstream direction as the angle of attack is increased. In other words, the increasing rate of change of pressure along chord represented by the inflexion point suggests a local static pressure in portion 154 that is greater than downstream thereof, effectively preventing or retarding upstream migration of the separation point.

According to some aspects of the invention, the MS ramp 154 may have a geometry that is dependent on the design Reynolds number for the aerofoil. For example, the higher the design Reynolds number, the larger the local curvature of the MS-ramp 154, and conversely, the lower the design Reynolds number, the lower the local curvature of the MS ramp. It is to be noted that the larger curvature MS-ramp that may be provided for a high design Reynolds number, also results in mild stall when the flow conditions are consistent with low Reynolds number, but at an additional drag penalty. By way of example, the design Reynolds number for a two element aerofoil may be between about $0.3*10^6$ to about $1.0*10^6$.

By way of non-limiting example, the SA-MS aerofoil 300 comprises an 18% thickness ratio, and has $Re_{design}=1.0*10^6$, and a geometry of such an aerofoil, denoted herein as aerofoil SA-MS/18-1.0 is shown in FIG. 6(a) and FIG. 6(b), compared with the geometry of a baseline slotted aerofoil of the same thickness ratio, and denoted herein as aerofoil MS-SA/18, illustrated in FIG. 6(c) and FIG. 6(d).

Figure 7A:
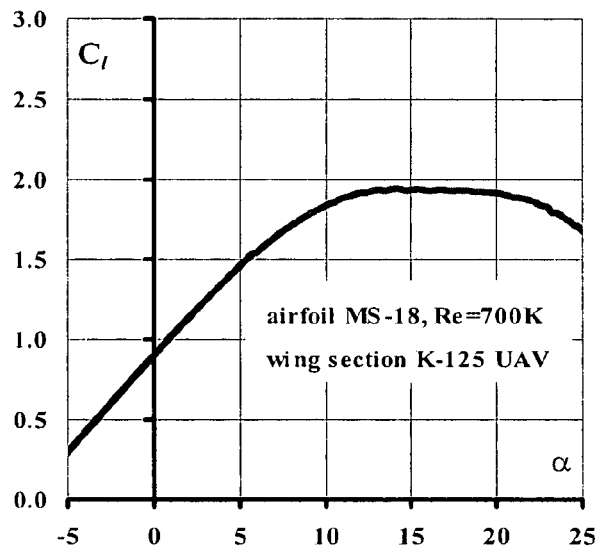
FIGS. 7(a) and 7(b) compare lift coefficient distributions with angle of attack of mild stall aerofoil MS-18 and slotted aerofoil SA-MS, at Re=$10^6$.
Figure 7B:
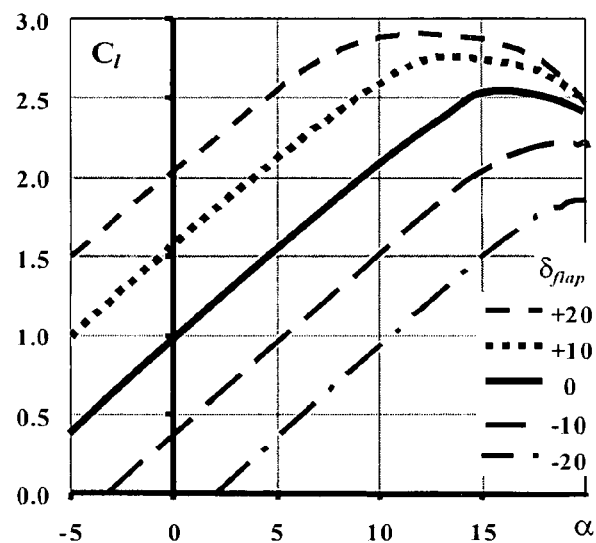
Figure 8A:
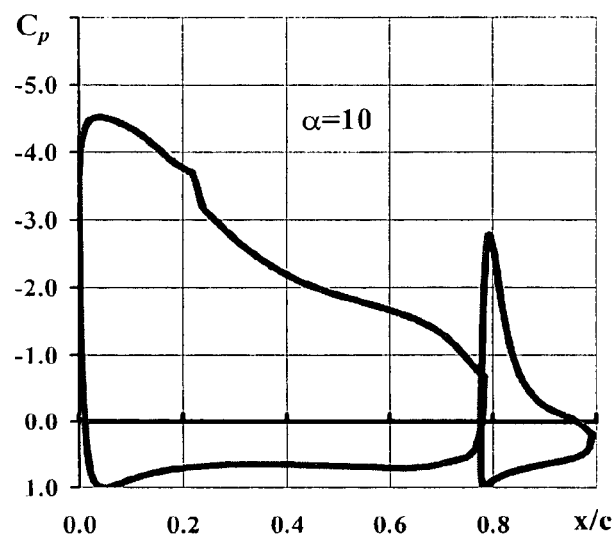
FIGS. 8(a) and 8(b) compare pressure distributions obtained for SA-MS/18-1.0 aerofoil at various angles of attack, with a flap deflection of about +20 degrees.
Figure 8B:
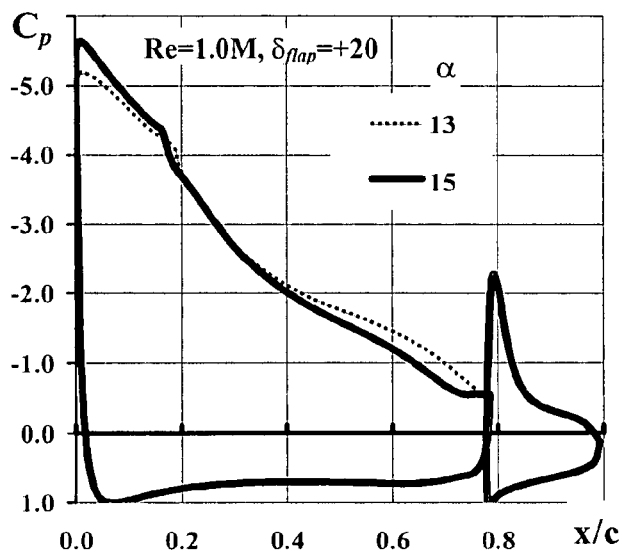

In this embodiment, the SA-MS aerofoil 300, at least for part of the wing span of wing half 10, comprises an adaptive geometry capability, as illustrated in FIG. 3, in which there is relative rotational movement between the primary element 32 and the secondary element 34. FIG. 7(a) and FIG. 7(b) illustrates lift characteristics of example aerofoil SA-MS/18-1.0 with different flap deflections, indicating mild stall characteristics for positive deflections of the second element and reasonable efficiency of flaps/ailerons up to high post-stall angles of attack. Pressure distributions for the case of deflected flap (FIGS. 8(a) and 8(b), forced transition at 70% of lower surface of the main body) show strong adverse pressure gradient at the trailing portion 38a of the primary element 32 and gradual development of separated flow on MS-ramp 154 with increasing post-stall angles of attack.

Figure 9:
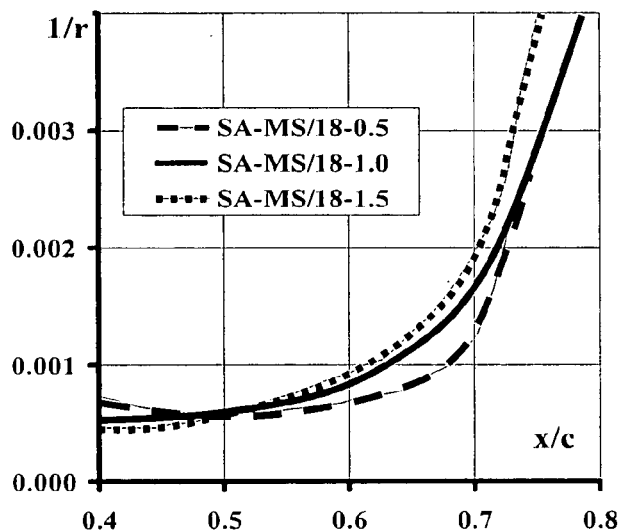
FIG. 9 schematically illustrates the local curvature of the upper suction surface of the main element of two-element aerofoils of FIG. 12 as a function of full aerofoil chord.
Figure 10:
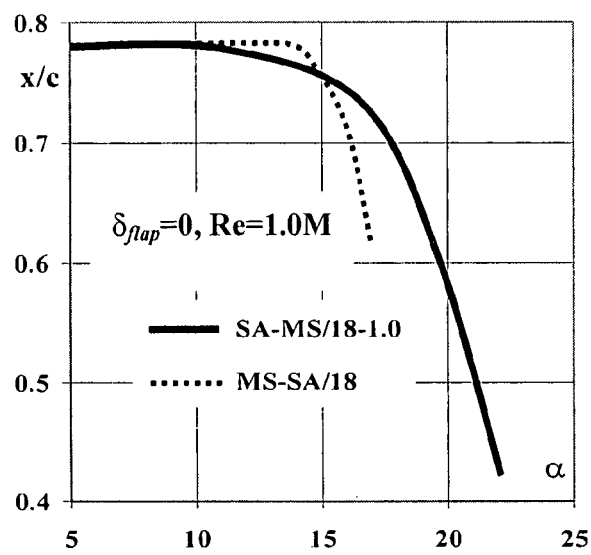
FIG. 10 schematically compares the location of the separated region on a SA-MS aerofoil with respect to that of a conventional two-element aerofoil.

Referring to FIG. 9, the local curvature distribution as a function of aerofoil chord obtained for a number of example SA-MS aerofoils (having different design Reynolds numbers) are compared, wherein at least from a chord distance from the leading edge 38 (x/c) of about 0.5, the curvature increases up to the trailing portion 38a of the leading element of the two element aerofoil 300. As illustrated in FIG. 10, the location of the separation region on the suction surface remains within a few percent of x/c constant up to angles of attack of about 15 to about 18 degrees with the SA-MS aerofoil, while in conventional two-element slotted aerofoils (for example aerofoil MS-SA/18), there is significant migration of the separation region at angles of attack below 15 degrees.

Figure 11A:
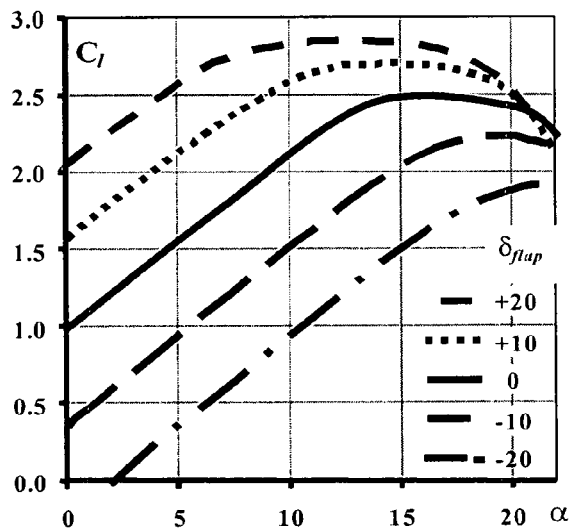
FIG. 11(a) compares lift coefficient distributions with angle of attack of slotted aerofoil SA-MS/18-1.5 ($Re_{design}$=1.5*$10^6$), at Re=$10^6$ for a range of flap angles.
Figure 11B:
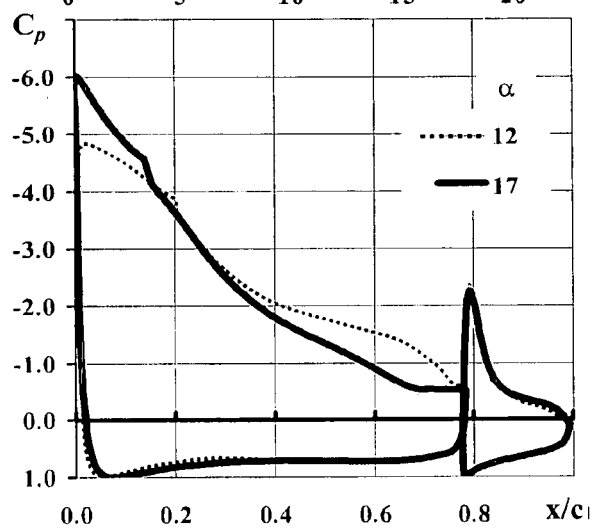
FIG. 11(b) provides pressure distributions obtained for aerofoil SA-MS/18-1.5 ($Re_{design}$=1.5*$10^6$), at Re=10 at various angles of attack, at flap deflection of +20 degrees.
Figure 12:
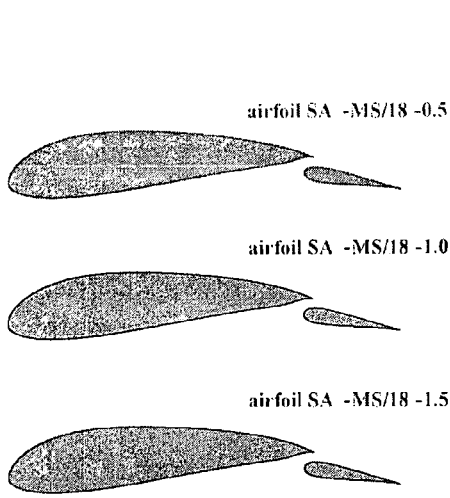
FIG. 12 compares the geometries of various SA-MS aerofoils according to embodiments of the invention, and lift coefficient variations thereof at various Reynolds numbers.

Designing the aerofoil 300 to provide high maximum lift with positive flap deflections may require some geometrical modifications of MS-ramp for achieving the best stalling characteristics, taking into account possible drag penalties associated with flow pattern on MS-ramp. This is illustrated in FIGS. 11(a) and 11(b), showing effect of flap deflections at $Re=1*10^6$ with aerofoil SA-MS/18-1.5, which is similar to aerofoil SA-MS/18-1.0, having a thickness ratio of 18%, but designed for $Re=1.5*10^6$ (see FIG. 12).

Figure 13A:
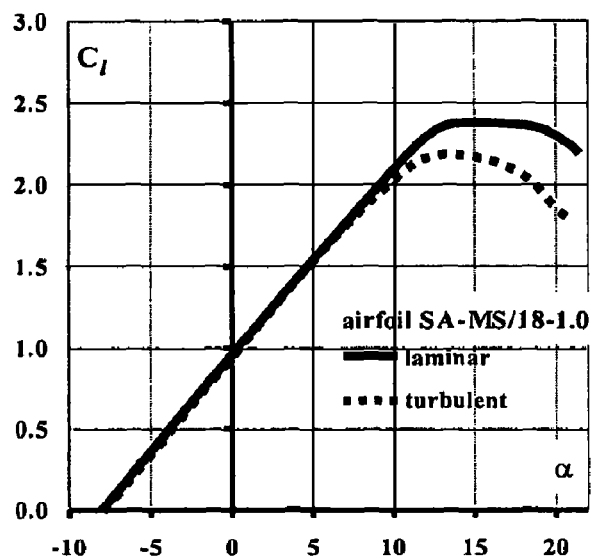
FIGS. 13(a) and 13(b) compare contamination effects obtained with aerofoils SA-MS/18-1.0 and SA-19 at Re=$10^6$.
Figure 13B:
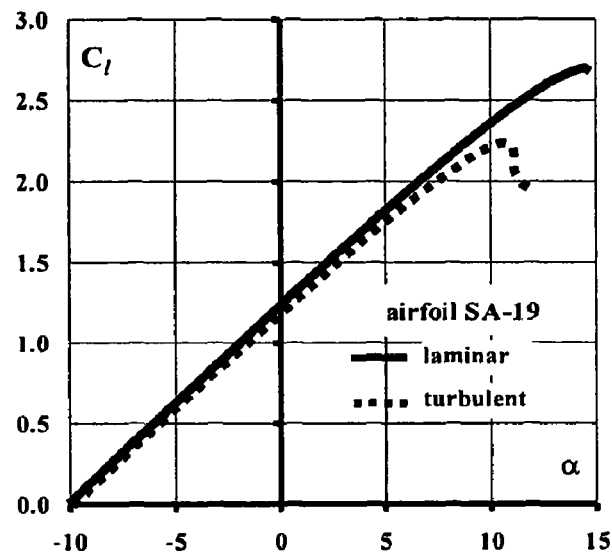
Figure 14A:
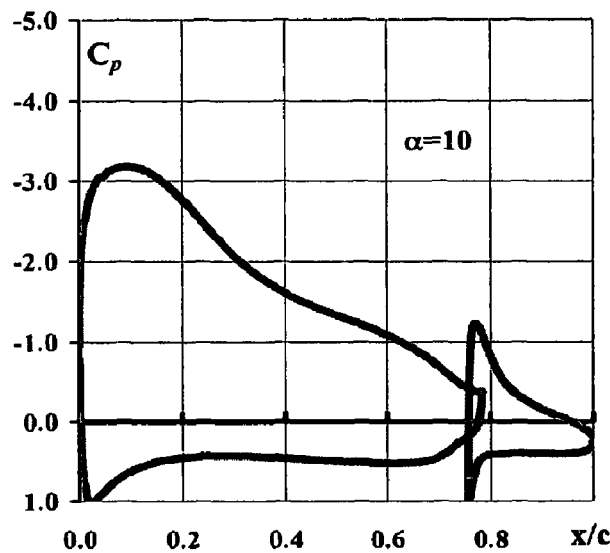
FIGS. 14(a) and 14(b) compare pressure distributions obtained for SA-MS/18-1.0 aerofoil at various angles of attack, at zero flap deflection.
Figure 14B:
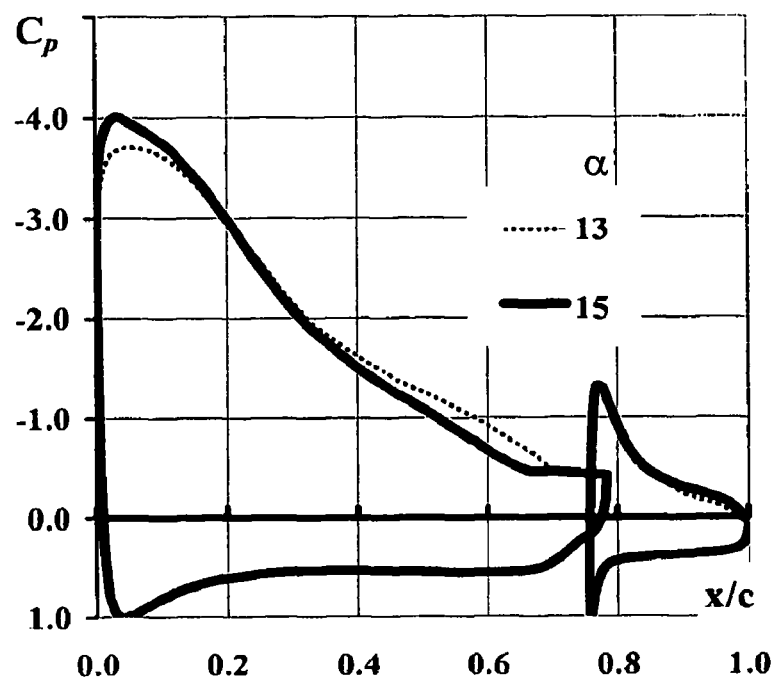

The SA-MS aerofoil 300 provides improvement of high-lift, mild-stall characteristics with respect to a corresponding regular SA aerofoil, while retaining advantageous features of non-slotted MS aerofoils and SA-aerofoils. Furthermore, the SA-MS aerofoil 300 provides reduced sensitivity to contamination effects, as compared with baseline SL aerofoils. This is illustrated in FIG. 13(a) and FIG. 13(b), in which are compared lift characteristics of a conventional two-element aerofoil (denoted SA-19, similar to the SA-18 slotted aerofoil, but having a thickness ratio of 19%), and the said embodiment of two-element, mild stall aerofoil SA-MS/18-1.0 at Re=$1.0*10^6$. Slowly creeping trailing edge separation on MS-ramp is retained for the case of fully turbulent aerofoil (FIG. 14(a) and FIG. 14(b)), resulting in modest maximum lift penalties. This feature may be attractive for development of high-lift wing sections with all weather flight capabilities, for example, in which said SA-MS aerofoils provide improvement of safety aspects of high-lift flight, possibility to eliminate the speed safety margin and provide stall/post-stall flight capabilities.

The SA-MS aerofoil sections for the wing 10 may be designed in any suitable manner. For example, it is possible to start with a known slotted aerofoil design that may be close in characteristics to that required, for example camber, thickness to chord ratio, and so on. Alternatively, a baseline aerofoil may be designed using known methods. Then, the baseline aerofoil contour may be modified to provide a relatively blunt leading edge to obtain high lift, and a suction surface that is cambered and/or has a thickness distribution such as to provide slowly creeping trailing edge separation. Then, the profile of a downstream portion of the suction surface of the leading element of the slotted aerofoil is changed so as to provide a local curvature ($1/r_{local}$) that in some parts thereof increases, and/or in other parts thereof remains substantially constant. CFD methods may be used, for example, to test the aerofoil, which can then be modified further, and again tested to determine whether the modification is providing the required aerodynamic effect. A number of such trial and error iterations may be carried out until a suitable profile for the aerofoil, providing the required characteristics, is achieved.

The full span of the half-wing 10 may comprise the same SA-MS aerofoil profile (scaled if necessary according to the aspect ratio, for example), save possibly for aerodynamic or structural features such as booms, wing tip winglets and the like, for example, in a similar manner to the configuration of regular SA aerofoils along the wing span of the IAI Heron, for example, mutatis mutandis. Alternatively, different portions of the half-wing 10 may comprise different SA-MS aerofoil profiles, suitably blended along the span or optionally comprising a flow separation plate or the like separating the various wing portions.

Figure 15:
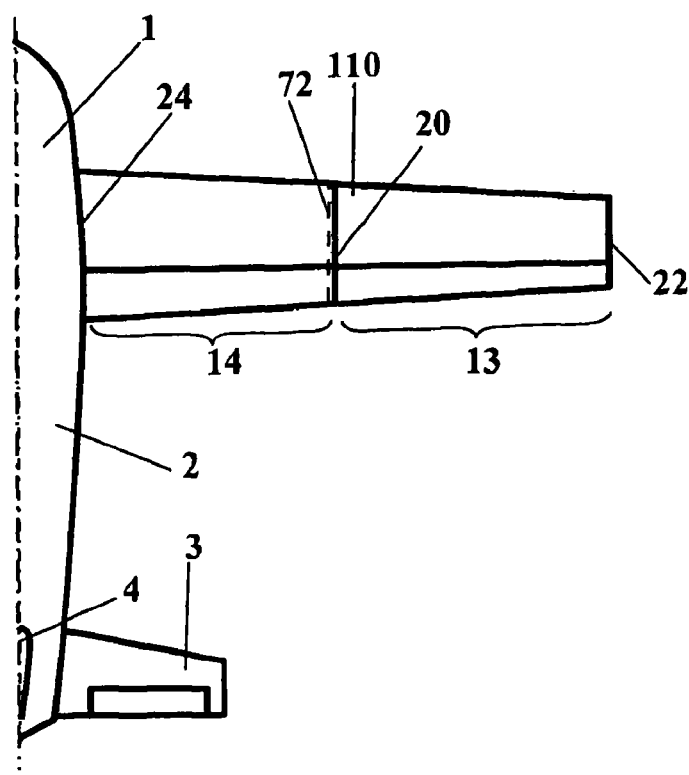
FIG. 15 schematically illustrates an aircraft comprising a wing according to a second embodiment of the present invention.

According to a second embodiment of the invention, and referring to FIG. 15, each wing half 10 of the aircraft 1 according to the first embodiment may be replaced with wing half 110, which comprises an outboard section 130 joined to or integral with an inboard section 140. The outboard section 130 may be defined as extending from the wing tip 22 to a transition station 20, while the inboard section 140 extends from the transition station 20 to the wing root 24.

By way of non-limiting example, the transition station 20 may be located at about 30% to about 60% of the wingspan from the wing tip 22 to the root 24, with the outboard section 130 being 30% to about 60% of the wingspan from the tip, and the inboard section 140 being about 70% to about 40% of the wingspan from the root.

In this embodiment, the inboard section 140 is based on SA-MS aerofoils 300, as described for the first embodiment, mutatis mutandis. However, the outboard section 130 comprises a regular slotted aerofoil (SL) configuration, for example aerofoil MS/SA-18 as illustrated in FIG. 6(c) and FIG. 6(d). The inboard section 140 may itself be divided into a plurality of subsections, for example in a similar manner to wing sections 10a to 10d of the first embodiment, mutatis mutandis, and thus some such sub sections may comprise, for example, a flap, airbrake or rigid non-movable secondary element 34. Similarly, the outboard section 130 may also be divided into a plurality of subsections, for example in a similar manner to wing sections 10a to 10d of the first embodiment, mutatis mutandis, and thus some such sub sections may comprise, for example, a flap, airbrake, aileron or rigid non-movable secondary element 34.

At the transition station 20, the aerofoil profile may be blended between the profile of the outboard section 130 and the inboard section 140. Alternatively, a plate 72, aligned generally orthogonally to the planform of the wing and also generally aligned with the direction of the flow over the wing 110 may be provided at the transition plane to separate the airflow between the MS-SA aerofoil-based and the SA aerofoil-based sections of the wing 110.

Figures 16, 17:
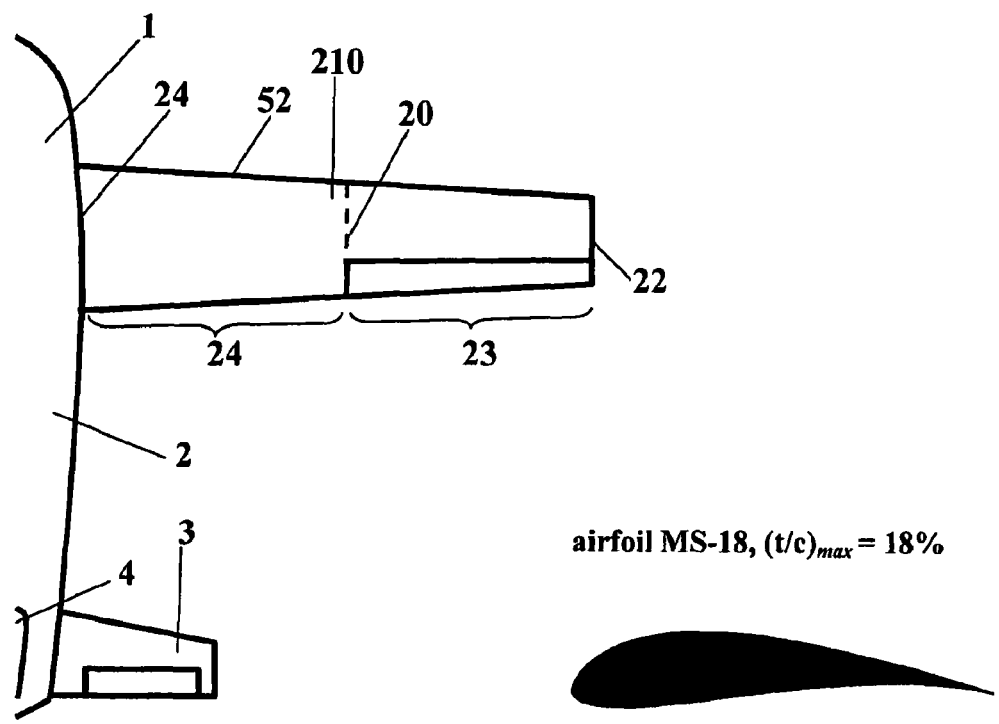
FIG. 16 schematically illustrates an aircraft comprising a wing according to a third embodiment of the present invention.
FIG. 17 schematically illustrates contour geometry of an embodiment of a high-lift, mild stall single element aerofoil designated herein as MS-18.

Referring to FIG. 16, a third embodiment of the invention is substantially similar to the second embodiment as described herein, mutatis mutandis, and each wing half 110 of the aircraft 1 according to the second embodiment may be replaced with wing half 210, which comprises an outboard section 230 joined to or integral with an inboard section 240, mutatis mutandis. However, in the third embodiment, the outboard wing to section 230 is based on MS-SL aerofoils, as described for the first or second embodiments, mutatis mutandis, and the inboard wing section 240 is based on single element mild stall aerofoils.

Figure 18:
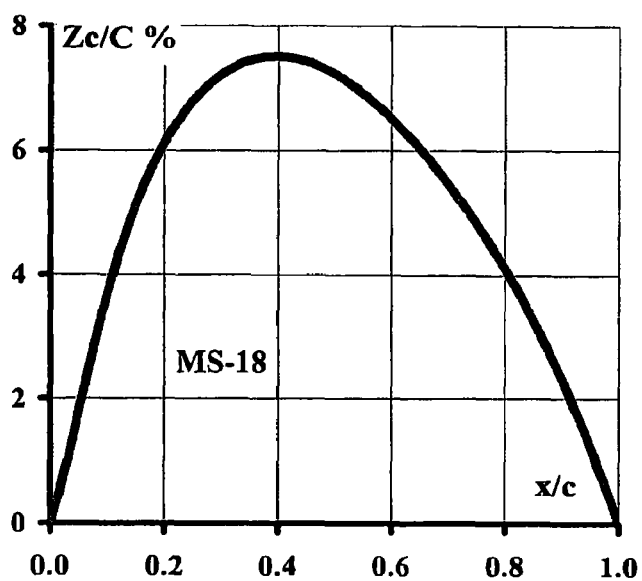
FIG. 18 schematically illustrates the camber distribution of the aerofoil embodiment of FIG. 17 along the chord thereof.
Figure 19:
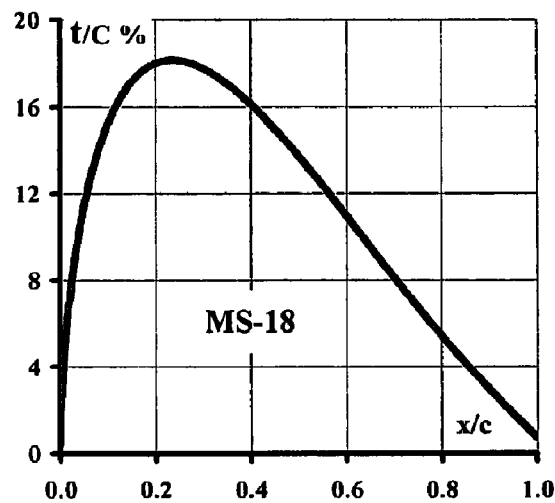
FIG. 19 schematically illustrates the thickness distribution the aerofoil embodiment of FIG. 17 along the chord thereof.

In particular, the inboard section 240 comprises a high-lift mild stall (HL-MS) configuration, or alternatively a mild stall (MS) configuration, for example as disclosed in co-pending U.S. application Ser. No. 11/802,139, which claims priority from Israel Patent Application No. 176022, filed 30 May 2006 and assigned to the present Assignee. The contents of said co-pending US application are incorporated herein in their entirety The inboard section 240 comprises a single element aerofoil design that provides mild stall characteristics, and in the case of HL-MS aerofoils, mild stall characteristics at a high level of maximum lift. By way of non-limiting example, and referring to FIG. 17, such an aerofoil design may have a thickness-to-chord ratio $(t/c)_{max}$ of between about 18% at about 22% of the chord, and a camber distribution and a thickness distribution optionally as illustrated in FIGS. 18 and 19, respectively, relating to a HL-MS aerofoil, having a maximum camber of about 7.5% at about 40% of the chord. This example aerofoil design is generally designated herein as MS-18, and the leading edge of the MS-18 aerofoil is relatively blunt or rounded, having a low curvature leading edge radius, and aft portion 54 of the aerofoil is cambered (FIG. 17).

High lift, mild-stall aerofoils (HL-MS-aerofoils) according to aspects of the invention are generally characterized by relatively high maximum lift relative to conventional MS aerofoils (see for example FIG. 20), while retaining and enhancing mild stall characteristics in the wide range of post-stall angles of attack. HL-MS aerofoils according to aspects of the invention comprise a blunt leading edge that substantially prevents formation of suction peak at high angles of attack, and may further comprise a highly cambered aft portion of the aerofoil that produces slowly creeping trailing edge separation as angle of attack is increased. The combination of continuous lift build-up at the forward portion of HL-MS aerofoils with slowly progressing trailing edge separation produces the feature of mild stall at high level of maximum lift and provides significant advantage relative to conventional MS-aerofoils.

Figure 20:
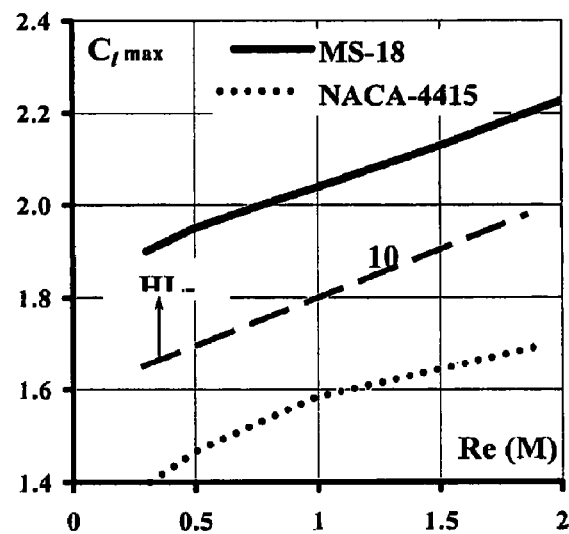
FIG. 20 schematic illustrates a $C_{l_{max}}$ boundary between conventional and high-lift MS-aerofoils, as a function of Reynolds number.

FIG. 20 illustrates the variation of maximum lift coefficient ($C_{l_{max}}$) as a function of Reynolds number for the MS-18 aerofoil, and compares this variation with the relatively inferior lift characteristics of a regular and standard mild stall aerofoil, such as the NACA-4415, for example.

Furthermore, FIG. 20 delineates a schematic boundary 100 between the $C_{l\,max}$-Re characteristics of reference, conventional mild stall aerofoils (MS aerofoils) and the corresponding characteristics of high-lift, mild-stall aerofoils (HL-MS aerofoils) according to aspects of the invention. This boundary thus defines a lower limit for $C_{lmax}$ obtained with a particular HL-ML aerofoil design at any particular Reynolds number (Re) between about $0.3*10^6$ and about $2.0*10^6$. The boundary 100 may be considered to suggest or approximate a linear minimal relationship between $C_{l\,max}$ and Re between these upper and lower Reynolds number limits, and the boundary 100 can thus be described by the relationship $$(C_{l\,max})_{min} = (0.35/(1.7*10^6))*Re + 1.6,\quad [0.3*10^6 < Re < 2.0*10^6] \qquad \text{Eq. 1}$$

The HL-MS aerofoil sections for the inboard section 240 may be designed in any suitable manner, such as to provide suitable $C_{l\,max}$-Re characteristics at or exceeding that suggested by Eq. 1 above. For example, it is possible to start with a known MS aerofoil design that may be close in characteristics to that required, for example camber, thickness to chord ratio, and so on. Alternatively, a baseline aerofoil may be designed using known methods. Then, the baseline aerofoil contour may be modified to provide a relatively blunt leading edge to obtain high lift, and a suction surface that is cambered and/or has a thickness distribution such as to provide slowly creeping trailing edge separation. CFD methods may be used, for example, to test the aerofoil, which can then be modified further, and again tested to determine whether the modification is providing the required aerodynamic effect. A number of such trial and error iterations may be carried out until a suitable profile for the aerofoil, providing the required characteristics, is achieved.

Alternatively, the inboard section 240 comprises mild stall (MS) aerofoils, for example NACA-4415 aerofoils, rather than HL-MS aerofoils, mutatis mutandis.

Figure 21:
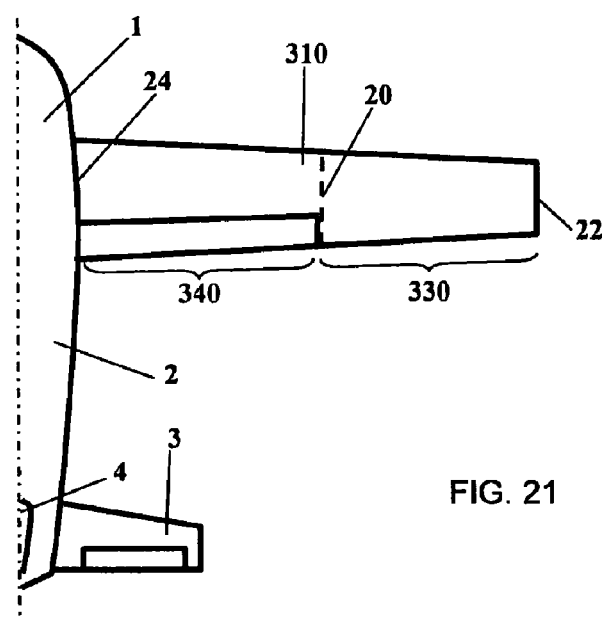
FIG. 21 schematically illustrates an aircraft comprising a wing according to a fourth embodiment of the present invention.

Referring to FIG. 21, a fourth embodiment of the invention is substantially similar to the third embodiment as described herein, mutatis mutandis, each wing half 210 of the aircraft 1 according to the third embodiment may be replaced with wing half 310, wherein in contrast to the third embodiment, the inboard wing section 340 is based on MS-SL aerofoils, as described for the first, second or third embodiments, mutatis mutandis, while the outboard wing section 330 is based on single element mild stall aerofoils as described for the third embodiment, mutatis mutandis.

Thus, as with the inboard section 240 the third embodiment, the outboard section 330 of the fourth embodiment comprises a high-lift mild stall (HL-MS) configuration, or alternatively a mild stall (MS) configuration, for example as disclosed in co-pending U.S. application Ser. No. 11/802,139, which claims priority from Israel Patent Application No. 176022, filed 30 May 2006 and assigned to the present Assignee.

In other embodiments, other arrangements of one or more wing portions based on HL-MS aerofoils, and/or one or more wing portions based on MS aerofoils, and/or one or more wing portions based on SA portions and/or one or more wing portions based on SA-MS aerofoils, may be provided along the length of the wing in any suitable combination. For example, there may be a wing portion based on HL-MS or MS aerofoils at the wing tip and another at the wing root, sandwiching a wing portion based on SA-MS and/or SL aerofoils.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed certain embodiments in accordance with the invention, it will be appreciated that many changes may be made therein without departing from the spirit of the invention.

REFERENCES

1. Drela, M., "Newton Solution of Coupled Viscous-Inviscid Multi-Element Airfoil Flow", AIAA 90-1470, AIAA Fluid Dynamics, Plasmodynamics and Laser Conference, Seattle, Wash., June 1990.
2. Drela, M., "A User's Guide to MSES V2.6", MIT Computational Aerospace Laboratory, May, 1994
3. Drela, M., "Elements of Airfoil Design Methodology", Applied Computational Aerodynamics, Progress in Astronautics and Aeronautics, Vol. 125, 1990.
4. Liebeck, R. H., "Subsonic Airfoil Design", Applied Computational Aerodynamics, Progress in Astronautics and Aeronautics, Vol. 125, 1990.
5. Steinbuch M., Marcus B. and Shepshelovich M., "Development of UAV Wings—Subsonic Designs". 41$^{st}$ Aerospace Sciences Meeting and Exhibit, Reno, Nev., 6-9 Jan., 2003.
6. Steinbuch, M., and Shepshelovich, M., "Development of High Altitude Long Endurance Airfoils", 42$^{nd}$ Aerospace Sciences Meeting and Exibit, Reno, Nev., 5-8 Jan., 2004.
7. Shepshelovich, M., "Aerodynamic Concept of IAI Long Endurance UAV". 44$^{th}$ Israel Annual Conference on Aerospace Sciences, 25-26 Feb., 2004.
8. Steinbuch, M. and Shepshelovich, M., "Development of UAV Wings—Transonic Designs", 43$^{rd}$ Aerospace Sciences Meeting and Exhibit, Reno, Nev., Jan. 10-13, 2005.
9. Steinbuch, M., Marcus, B., and Shepshelovich, M., "The Concept of Hybrid Transonic-Subsonic Wings", 45$^{th}$ Israel Annual Conference on Aerospace Sciences, 23-24 Feb., 2005.
10. Shepshelovich, M., "UAV Wing Design—a New Challenge", International Seminar—Aero India 2005, Bangalore, India, 7-9 Feb. 2005.
11. Koss, D., and Shepshelovich, M., "Design and Experimantal Evaluation of Two-element, High-Lift/Low-Drag, Long Endurance Airfoil", 35$^{th}$ Israel Annual Conference on Aerospace Sciences, February, 1995.
12. Koss, D., Steinbuch, M., and Shepshelovich, M., "Development of Two-Element NLF Airfoils for Long Endurance Flight", 35$^{th}$ Aerospace Meeting and Exibit, Jan. 6-10, Reno, Nev., 1997.
13. Koss, D., Steinbuch, M. and Shepshelovich, M., "Design and Experimental Evaluation of High-Lift, Mild-Stall Airfoil", 12$^{th}$ AIAA Applied Aerodynamics Conference, June 1994.
14. Nagel, A., and Shepshelovich, M., "Development of High Lift, Mild Stall Airfoils". 43$^{rd}$ Israel Annual Conference on Aerospace Sciences, 19-20 Feb. 2003.

15. Nagel, A., and Shepshelovich, M., "The concept of High-Lift, Mild Stall Wing". 24$^{th}$ International Congress of the Aeronautical Sciences, Yohogama, Japan, 29 Aug.-3 Sep. 2004.
16. Nagel, A., and Shepshelovich, M., "Wing Concepts for Tactical UAV". 45$^{th}$ Israel Annual Conference on Aerospace Sciences, 23-24 Feb., 2005.
17. Hicks, R. M. and Schairer, E. T., "Effects of Upper Surface Modification on the Aerodynamic Characteristics of the NACA 63$_2$-215 Airfoil Section", NASA TM78503, 1979.
18. McGhee R. J. and Beasley W. D., "Wind-Tunnel Results for a Modified 17-Percent-Thick Low-Speed Airfoil Section", NACA Technical Paper 1919, 1981.
19. Marcus, B., Sarid, M., and Shepshelovich, M., "Aerodynamics of Contaminated UAV Wings". 45$^{th}$ Israel Annual Conference on Aerospace Sciences, 23-24 Feb. 2005.

The invention claimed is:

1. A mild stall slotted aerofoil comprising:
a leading element;
a trailing element; and
a slot therebetween,
wherein said leading element is contoured to provide mild stall characteristics for the aerofoil,
wherein said aerofoil maintains a stall plateau for an angle of attack range of at least 7 degrees where the lift coefficient associated with said aerofoil is within up to about 5% of a maximum lift coefficient associated with said aerofoil.

2. An aerofoil according to claim 1, said leading element including a leading edge of the aerofoil, and said trailing element including a trailing edge of the aerofoil, wherein said leading element comprises a downstream suction surface portion comprising a local curvature that does not decrease along a direction towards said slot.

3. An aerofoil according to claim 2, wherein said curvature increases along said portion along said towards said slot.

4. An aerofoil according to claim 2, wherein said portion comprises one of at least about 10%, at least about 20%, at least about 30%, at least about 40%, or at least about 50% of a local chord of said leading element, terminating at a trailing portion of said leading element.

5. An aerofoil according to claim 2, wherein said trailing element is pivotably movable with respect to said leading element via a hinge point.

6. An aerofoil according to claim 5, wherein said hinge point is outwardly displaced with respect to an outer contour of said trailing element.

7. An aerofoil according to claim 5, further comprising a suitable actuation mechanism for deflecting said trailing element in a positive or negative direction with respect to the leading element.

8. An aerofoil according to claim 5, wherein said trailing element is adapted for operating as one or more of: flaps; ailerons; airbrake; and for providing decambering at maximum speed flight.

9. An aerofoil according to claim 2, wherein said slot comprises a width dimension at least 2% of the aerofoil chord.

10. An aerofoil according to claim 2, wherein said aerofoil is configured for generating a pressure coefficient distribution obtained on the suction surface of the primary element comprising an inflexion point, associated with said suction surface portion.

11. A wing, comprising at least a first wing portion comprising a mild stall slotted aerofoil (SA-MS), comprising
a leading element,
a trailing element and
a slot therebetween,
wherein said leading element is contoured to provide mild stall characteristics,
wherein said aerofoil maintains a stall plateau for an angle of attack range of least 7 degrees where the lift coefficient associated with said aerofoil is within up to about 5% of a maximum lift coefficient associated with said aerofoil.

12. A wing according to claim 11, said leading element including a leading edge of the aerofoil, and said trailing element including a trailing edge of the aerofoil, wherein said leading element comprises a downstream suction surface portion comprising a local curvature that does not decrease along a direction towards said slot.

13. A wing according to claim 12, wherein said curvature increases along said portion along said towards said slot.

14. A wing according to claim 13, wherein said portion comprises one of at least about 10%, at least about 20%, at least about 30%, at least about 40%, or at least about 50% of a local chord of said leading element, terminating at a trailing portion of said leading element.

15. A wing according to claim 12, wherein said trailing element is pivotably movable with respect to said leading element via a hinge point.

16. A wing according to claim 15, wherein said hinge point is outwardly displaced with respect to an outer contour of said trailing element.

17. A wing according to claim 15, further comprising a suitable actuation mechanism for deflecting said trailing element in a positive or negative direction with respect to the leading element.

18. A wing according to claim 15 wherein said trailing element is adapted for operating as one or more of: flaps; ailerons; airbrake; and for providing decambering at maximum speed flight.

19. A wing according to claim 12, wherein said aerofoil is configured for generating a pressure coefficient distribution obtained on the suction surface of the primary element comprising an inflexion point, associated with said suction surface portion.

20. A wing according to claim 12, wherein said first wing portion extends along substantially the full span of the wing.

21. A wing according to claim 12, further comprising a second wing portion based on a slotted aerofoil configuration comprising
a leading element including a leading edge of the aerofoil, and
a trailing element including a trailing edge of the aerofoil, and
a slot between said leading element and said trailing element,
wherein said leading element comprises a downstream suction surface portion comprising a local curvature that substantially decreases along a direction towards said slot.

22. A wing according to claim 21, wherein second wing portion is an outboard portion with respect to said first wing portion.

23. A wing according to claim 12, further comprising a second wing portion configured for providing mild stall characteristics.

24. A wing according to claim 23, wherein said second wing portion is configured for providing high-lift mild stall characteristics at least at Reynolds numbers in the range between about $0.2*10^6$ and about $2.0*10^6$.

25. A wing according to claim 24, wherein said second wing portion comprises high-lift, mild-stall aerofoils (HL-MS aerofoils), each said HL-MS aerofoil having a maximum lift coefficient ($C_{l\,max}$) at a Reynolds number (R) between about $0.3*10^6$ and about $2.0*10^6$ that is substantially not less than a minimum value for the maximum lift coefficient (($C_{l\,max})_{min}$) at said Reynolds number R according to the relationship:

$$(C_{l\,max})_{min} = (0.35/(1.7*10^6))*R + 1.6.$$

26. A wing according to claim 23, wherein said second wing portion is configured for providing mild stall characteristics at least at Reynolds numbers in the range between about $0.2*10^6$ and about $2.0*10^6$.

27. A wing according to claim 26, wherein said second wing portion comprises mild-stall aerofoils (MS aerofoils), each said MS aerofoil having a maximum lift coefficient ($C_{l\,max}$) at a Reynolds number (R) between about $0.3*10^6$ and about $2.0*10^6$ that is substantially less than a minimum value for the maximum lift coefficient (($C_{l\,max})_{min}$) at said Reynolds number R according to the relationship:

$$(C_{l\,max})_{min} = (0.35/(1.7*10^6))*R + 1.6.$$

28. A wing according to claim 25, wherein second wing portion is an inboard portion with respect to said first wing portion.

29. A wing according to claim 27, wherein second wing portion is an inboard portion with respect to said first wing portion.

30. A wing according to claim 25, wherein second wing portion is an outboard portion with respect to said first wing portion.

31. A wing according to claim 27, wherein second wing portion is an outboard portion with respect to said first wing portion.

32. An air vehicle comprising wings according to claim 11.

33. An air vehicle according to claim 32, wherein said wings are the main lift-producing wings of said air vehicle.

34. An air vehicle according to claim 32, wherein said air vehicle is an Unmanned Air Vehicle (UAV).

35. An air vehicle according to claim 34, wherein said UAV is adapted for long range endurance and loitering.

36. A mild stall slotted aerofoil comprising:
a leading element;
a trailing element; and a slot therebetween,
wherein said leading element is contoured to provide mild stall characteristics for the aerofoil,
wherein said leading element comprises a downstream suction surface portion comprising a local curvature that does not decrease along a direction towards said slot, and
wherein said aerofoil maintains a stall plateau for an angle of attack range of at least 7 degrees where the lift coefficient associated with said aerofoil is within up to about 5% of a maximum lift coefficient associated with said aerofoil.

37. An aerofoil according to claim 36, wherein said curvature increases along said portion along said towards said slot.

38. An aerofoil according to claim 36, wherein said portion comprises one of at least about 10%, at least about 20%, at least about 30%, at least about 40%, or at least about 50% of a local chord of said leading element, terminating at a trailing portion of said leading element.

39. An aerofoil according to claim 36, wherein said trailing element is pivotably movable with respect to said leading element via a hinge point.

40. An aerofoil according to claim 36, wherein said hinge point is outwardly displaced with respect to an outer contour of said trailing element,
wherein said aerofoil further comprises a suitable actuation mechanism for deflecting said trailing element in a positive or negative direction with respect to the leading element, and
wherein said trailing element is adapted for operating as one or more of: flaps; ailerons; airbrake; and for providing decambering at maximum speed flight.

41. An aerofoil according to claim 36, wherein said slot comprises a width dimension at least 2% of the aerofoil chord.

42. An aerofoil according to claim 36, wherein said aerofoil is configured for generating a pressure coefficient distribution obtained on the suction surface of the primary element comprising an inflexion point, associated with said suction surface portion.

43. A wing, comprising at least a first wing portion comprising a mild stall slotted aerofoil (SA-MS) as defined in claim 36.

44. A wing according to claim 43, wherein said first wing portion extends along substantially the full span of the wing.

45. A wing according to claim 43, further comprising a second wing portion based on a slotted aerofoil configuration comprising
a leading element including a leading edge of the aerofoil, and
a trailing element including a trailing edge of the aerofoil, and
a slot between said leading element and said trailing element,
wherein said leading element comprises a downstream suction surface portion comprising a local curvature that substantially decreases along a direction towards said slot.

46. A wing according to claim 45, wherein second wing portion is an outboard portion with respect to said first wing portion.

47. A method for designing an aircraft wing aerofoil, comprising:
(a) designing the aerofoil as a two element aerofoil, comprising a leading element and a trailing element, and a slot therebetween,
(b) contouring a downstream portion of a suction surface of said leading element such
as to provide mild stall characteristics;
wherein said aerofoil maintains a stall plateau for an angle of attack range of at least 7 degrees where the lift coefficient associated with said aerofoil is within up to about 5% of a maximum lift coefficient associated with said aerofoil.

48. A method according to claim 47, wherein step (b) comprises contouring a downstream portion of a suction surface of said leading element such that a local curvature of said portion does not substantially decrease along a direction towards said slot.

49. A method according to claim 47, wherein said portion comprises a curvature that substantially increases along said aft portion thereof towards said slot.

* * * * *